United States Patent [19]

Strathoff et al.

[11] 4,087,260
[45] May 2, 1978

[54] APPARATUS FOR SORPTION FILTERS AND METHOD FOR OPERATING THEM

[75] Inventors: Dieter Strathoff, Bork; Karl Winter, Dortmund-Solde; Günter Staschik, Halingen, all of Germany

[73] Assignee: Ceagfilter und Entstaubungstechnik GmbH, Dortmund, Germany

[21] Appl. No.: 738,468

[22] Filed: Nov. 3, 1976

[30] Foreign Application Priority Data

Apr. 17, 1976 Germany .............................. 2616999

[51] Int. Cl.² ............................................. B01D 53/04
[52] U.S. Cl. ......................................... 55/28; 55/62; 55/208; 55/387
[58] Field of Search ................... 55/25, 27, 28, 59, 62, 55/179, 208, 269, 387; 210/180, 186; 252/411 R, 416, 417

[56] References Cited

U.S. PATENT DOCUMENTS

| | | | |
|---|---|---|---|
| 1,843,446 | 2/1932 | Drager | 55/387 X |
| 2,745,552 | 5/1956 | Bruggeman et al. | 210/186 X |
| 3,103,425 | 9/1963 | Meyer | 55/62 |
| 3,225,524 | 12/1965 | Berrian | 55/387 X |
| 3,263,400 | 8/1966 | Hoke et al. | 55/62 X |
| 3,480,558 | 11/1969 | Lum et al. | 252/416 |
| 3,483,980 | 12/1969 | Cochran et al. | 210/186 X |
| 3,930,803 | 1/1976 | Winter | 55/84 X |

*Primary Examiner*—Charles N. Hart
*Assistant Examiner*—Robert H. Spitzer
*Attorney, Agent, or Firm*—Herbert L. Lerner

[57] ABSTRACT

Apparatus and method for the adsorption in sorption filters of impurities from a stream of air or gas and for the desorption of the impurities by an inert gas after the filter is charged to a predetermined level, in which the sorption filter is a ring layer filter with a container surrounding a sorption medium layer composed of concentric perforated metal sheets with an adsorption medium disposed in between, in the form of cylindrical rings. An outer jacket surrounds the container with a gap therebetween through which coolant flows. Near the top of the gap are discharge openings closed by louvers which open automatically upon increase in pressure in the cooling gap.

11 Claims, 1 Drawing Figure

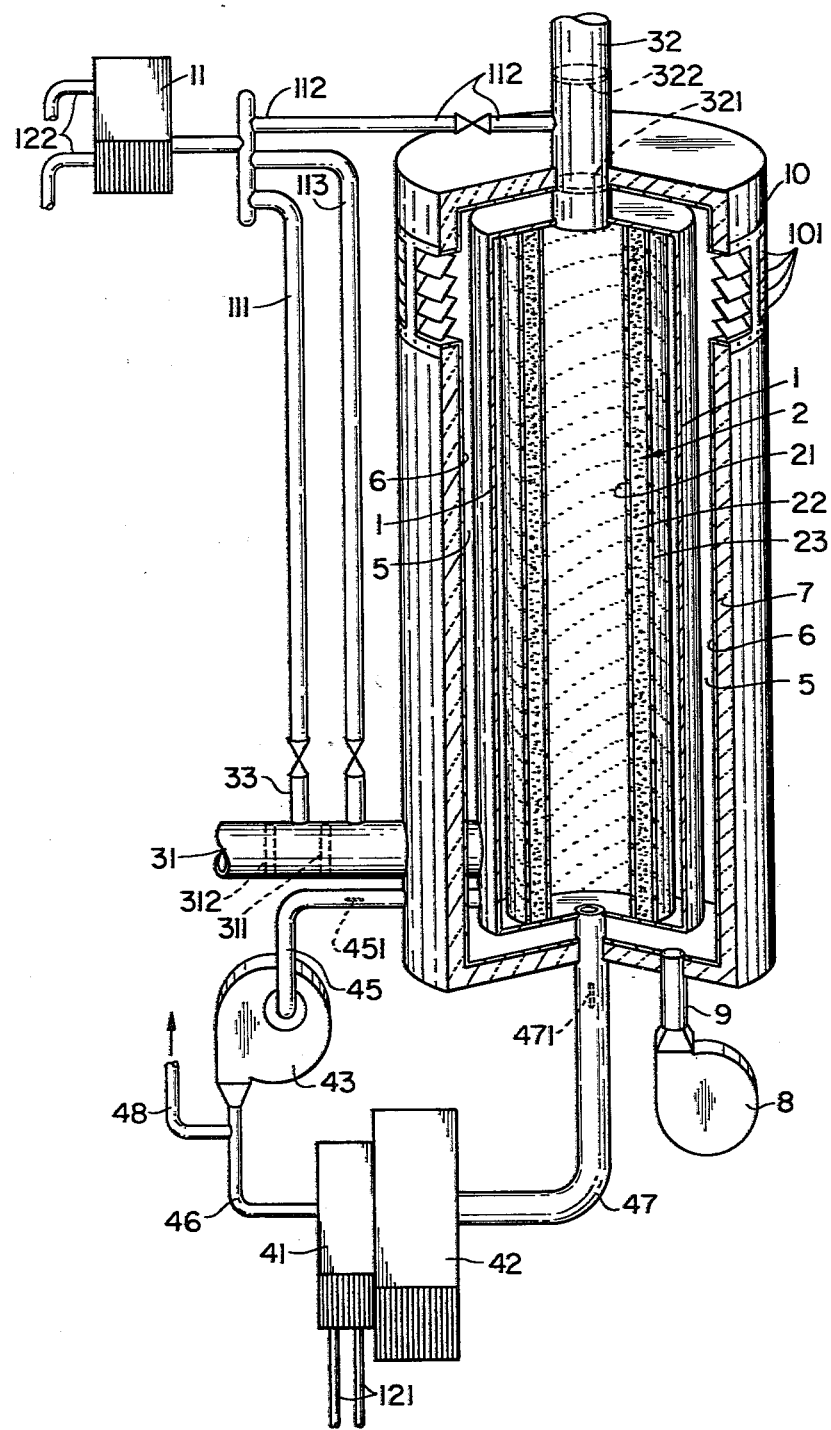

APPARATUS FOR SORPTION FILTERS AND METHOD FOR OPERATING THEM

CROSS-REFERENCES TO RELATED APPLICATIONS

U.S. application Ser. No. 738,537, filed for Method and Apparatus for the Selective Adsorption of Vaporous or Gaseous Impurities from other Gases, on Nov. 3, 1976; and U.S. application Ser. No. 738,569 filed for Purifying an Air or Gas Stream Containing Combustible Vaporous or Gaseous Impurities, on Nov. 3, 1976.

BACKGROUND OF THE INVENTION

1. Field of the Invention

This invention relates to apparatus for the adsorption of vaporous or gaseous impurities which can be adsorbed in sorption filters, from air or other gases as well as to their desorption by an inert gas produced by stoichiometric combustion of coal, coke or hydrocarbons after the sorbents used in the sorption filter have been loaded with adsorbed impurities to a certain level, as well as a method for operating them safely.

2. Description of the Prior Art

Sorption filters are employed in process engineering for separating gaseous or vaporous mixtures or substances. They have become important, in particular, in the purification of exhaust gases and exhaust air where organic substances such as for instance solvents or also substances which are malodorous and offend the olefactory senses of the population in the surrounding neighborhood. Separation of such substances by adsorption is known from the solvent recovery installations used for this purpose. It is likewise known to remove foul smelling substances from exhaust air or exhaust gas through adsorption. The problem of desorption is therefore dealt with by the known water vapor desorption in the solvent recovery installations, by stack gas desorption or by desorption with inert gas specially generated for this purpose. Typical for this are method and apparatus such as are described, for instance, in the U.S. Pat. Nos. 3,853,985; 3,905,783; 3,930,803 and German Published Prosecuted Patent Application No. P 22 48 267. In these cases the sorption filter, after a certain loading with adsorbable substances is reached, is switched off the gas or air stream and is desorbed by an inert gas generated by stoichiometric combustion of coal, coke or hydrocarbons. To improve the flushing of desorbate, this inert gas is advantageously conducted in a closed loop, and part of the inert gas loaded with desorbate is branched off and fed either to thermal after-combustion or to a cooler. The branched-off gas is replaced by freshly generated inert gas. This freshly generated gas therefore carries with it the heat energy which is required for the desorption.

SUMMARY OF THE INVENTION

An object of the present invention is to provide efficient apparatus and method for the adsorption in sorption filters of impurities from a stream of air or gas and for the desorption of the impurities by an inert gas after the filter is charged to a predetermined level, and particularly to provide improved means for controlling the desorption of the filter of impurities.

With the foregoing and other objects in view, there is provided in accordance with the invention apparatus for the adsorption in sorption filters of vaporous or gaseous impurities from a stream of air or gas and for the desorption of the impurities by an inert gas after the filter is charged to a predetermined level, which includes a sorption filter, a container surrounding the sorption filter, an outer jacket around the container, an annular gap between the container and the outer jacket through which coolant flows, an inlet conduit extending through the outer jacket, the gap and the container for the introduction of the stream of air or gas containing impurities for passage to one side of the filter permitting the air or gas to pass therethrough and charge the filter to a predetermined level, an outlet conduit extending through the container, the gap and the outer jacket for the discharge of the air or gas passing through the filter and leaving the side of the filter opposite the side of introduction of the air or gas, gas inlet closing means on the inlet side for introduction of the air or gas containing impurities, gas outlet closing means on the discharge side of the air or gas for blocking the flow of the air or gas, a combustion chamber outside the outer jacket for generating an inert gas, an inert gas inlet conduit extending through the outer jacket, the gap and the container for introducing the inert gas through the filter in a direction of flow opposite that of said air and gas to desorb the filter, an inert gas outlet conduit extending through the container, the gap and the outer jacket for the discharge of desorbate and inert gas, and a coolant inlet extending through the outer jacket into the gap for the introduction of coolant flowing through the gap.

In accordance with the invention there is provided a method for the adsorption in sorption filters of vaporous or gaseous impurities from a stream of air or gas and for the desorption of the impurities by an inert gas after the filter is charged to a predetermined level, which includes passing the air or gas containing impurities through a ring layer sorption filter surrounded by a container to purify the air or gas, continuing the passage of air or gas until the impurities in the filter reach a predetermined level, terminating the passage of the air or gas containing impurities, passing a coolant in indirect heat exchange with the sorption filter by flowing the coolant over the outer surface of the container in a gap between the container and an outer jacket surrounding the container, generating a cold protective gas, passing the protective gas through the filter, passing the cold protective gas in the interspace between a pair of spaced dampers for blocking the inlet flow of the air or gas to the filter, and to the interspace between another pair of spaced dampers for blocking the outlet flow of the purified air or gas from the filter, generating a hot inert gas, passing the hot inert gas through the filter to desorb the filter, and flowing the coolant through the gap to extract heat from the container during desorption and to cool the container to a temperature below about 600° C.

In an embodiment of the instant invention during cooling of the filter, cold protective gas is introduced into the interspace of the inlet flow and the interspace of the outlet flow, and the protective gas in the interspaces is permitted to bleed into the adsorption zone during the cooling to compensate for shrinkage of gas in the adsorption zone as a result of the cooling.

BRIEF DESCRIPTION OF THE DRAWING

Other features which are considered as characteristic for the invention are set forth in the appended claims.

Although the invention is illustrated and described herein as embodied in apparatus for sorption filters and method for operating them, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing which diagrammatically illustrates apparatus for carrying out the present invention.

DETAILED DESCRIPTION OF THE INVENTION

Desorption is conducted at very high temperatures of above 500° C and this creates problems. The high temperatures induce cracking of hydrocarbon sorbate and the higher the temperature the more drastic the cracking with formation of carbon. The hot inert gas generally contains carbon dioxide as well as steam which attack such carbon, and which also effect an activating desorption, particularly if activated carbon is used as the desorbent. This desorption as well as activation should be accomplished in an optimum time without net consumption of carbon. The temperature of activating-desorption will range from about 500° to 850° C. At temperatures below about 500° C the activating-desorption rate is unduly prolonged. At temperatures above 850° C time for activating and desorption is quite short but unfortunately non-uniform reactivation takes place with overactivation occurring on the inside of the carbon ring used as the sorption medium. The preferred temperature of activating-desorption is 700° – 800° C, desirably 725° – 775° C. At 750° C uniform reactivation is obtained in a period of about 2 hours which includes about 15 minutes for heating-up time. Uniform activation is also obtained at 700° C but at the expense of a longer time, almost 4 hours, and increased cost of fuel. Activation-desorption takes an even longer time at 500° C.

As previously mentioned, cracking of the hydrocarbon sorbate forms carbon in an amount which varies but may be generally taken as about 5% by weight of the activated carbon medium. Burnup of carbon during activation-desorption to an amount approximately equal to the carbon formed will maintain the body of activated carbon substantially constant. Burnup can be controlled in the usual manner by volume of gas, temperature and other conditions of operation.

In the structure of the present invention there is a metal container surrounding the filter. Passage of hot inert gas through the filter at a high temperature of say 750° C, during desorption, will raise the temperature of the metal container to over 700° C. Metal containers, other than special alloy expensive metals, will not withstand a temperature above about 600° C for any extended time without impairment of the metal. To overcome this difficulty there is provided an outer jacket around the container with an annular gap between the container and the outer jacket through which coolant flows to cool the container to a temperature below 600° C, preferably below 500° C while permitting the filter in the interior of the container to be desorbed and reactivated by hot inert gas at 750° C. The coolant may be air which is introduced by means of a blower near the bottom of the gap, flowing across the surface of the container in direct contact therewith, extracting heat from the container and cooling it, and then discharging the heated air from openings near the top of the outer jacket. The degree of cooling may be controlled by the rate of flow of air through the gap. Other coolants may of course be employed but air is preferred because of economy, convenience and simplicity. The inert gas conducted in a closed loop must be cooled, particularly toward the end of the desorption and the sorption filter which is desorbed must be closed off sufficiently tightly against the rest of the system in order to effectively prevent oxygen from penetrating. Although these requirements are met to some extent through the use of a cooler in the inert gas loop as well as by the installation of tightly closing shutters in the raw gas inlet and the pure gas outlet of the sorption filter a substantial stress of the material is connected with the temperature changes to which the cooler and the shutters are subjected and it is not impossible for leaks to occur due to the temperature changes, which permit oxygen to penetrate and thus make a trouble-free conclusion of the desorption process including the cooling following the desorption questionable. The container of the sorption filter is also subject to stresses, particularly at the high occurring temperatures.

For this purpose, as previously described, the container of the sorption filter is surrounded by an annular-gap cooler. The shutters shutting off the raw gas inlet and the pure gas outlet are in the form of dual dampers or shutters. In addition an additional small protective-gas generator is connected to the apparatus in such a manner that protective gas can be admitted to the spaces between the shutters. Cooling of the adsorption zone after desorbing with hot inert gas results in shrinkage of gas therein creating a reduced pressure or partial vacuum therein. This produces a strain on the equipment and generally results in unwanted gas, usually air, rushing into the low pressure adsorption zone. The oxygen in the air may cause difficulties such as burning the activated carbon of the filter and may even cause a rise in temperature. A supply of protective gas introduced to the spaces between the dampers is permitted to flow into the adsorption zone to compensate for the shrinkage of gas therein and avoid the difficulties with air rushing in. The apparatus illustrated in the drawing is shown in the condition for "cooling and desorption". The sorption filter is a ring layer filter with a jacket 1 of the sorption filter container and the sorption medium layer 2. This sorption medium layer 2 consists of the cylindrical support means which support the sorption means in layer fashion, and consist, for instance, of perforated metal sheets 21 and 23 as well as the sorption medium layer 22 in the form of cylindrical rings, disposed in between. A connecting stub 31 for the raw-gas inlet and a connecting stub 32 for the puregas outlet allow the sorption filter to be installed into the pipe train of the gas to be purified. In the connecting stubs 31 and 32, dual dampers or shutters 311 and 312 for stub 31 as well as dual dampers 321 and 322 for stub 32 are provided for shutting off the sorption filter from the lines supplying and discharging the gas. Gas supply stubs 33 and 112 at the connecting stubs 31 and 32 are equipped with valves and establish a connection with the buffer spaces which are formed between the shutters 311 and 312 as well as 321 and 322. These gas supply stubs are connected via lines 111 and 112 to a protective gas generator 11 and the protective gas generated by this protective gas generator can be fed to the buffer spaces.

The sorption filter container is surrounded by an annular-ring cooler with an annular gap 5 through which a coolant, preferably air flows. An outer jacket 6 bounds the outer side of the annular gap. Under operating conditions other than cooling, excessive heat loss is to be prevented, and therefore outer jacket 6 is provided with thermal insulation 7. If cooling is to take place, a coolant blower 8 pushes the coolant through the connecting line 9 into the annular gap 5. At least three discharge openings 10 are arranged uniformly over the circumference of the outer jacket 6 and are closed by a louver 101. Louvers are normally closed but are set to open at an over-pressure in the annular gap 5, i.e. a slight superatmospheric pressure, to allow the coolant to flow off. This makes possible emergency cooling in the event of a failure of the coolant blower 8 by virtue of movement of air through the louver without the need of forced flow. Also if the jacket of the sorption filter is heated excessively high, the surrounding air becomes hot, expands and builds up a pressure in gap 5, which pressure is relieved by discharge of hot air through louver 101.

The sorption medium loop consists of an inert gas generator 41, a mixing chamber 42, a desorption medium blower 43 and the desorption medium lines 45, 46 and 47 which can be shut off by means of shutters 451 and 471. A connecting line 48 permits the desorption medium loaded with desorbate to be conducted to an after-treatment, for example, thermal after-combustion or condensation. An additional line 111, similarly equipped with a valve, establishes a connection between protective gas generator 11 and the desorption medium loop. The inert gas generator 41 and the protective gas generator 11 are supplied with fuel and combustion air via the lines 121 and 122 if the oxygen-free desorption medium and the inert protective gas are generated by stoichiometric combustion of a fuel.

To operate this apparatus the gas stream to be purified is conducted, according to the invention, through the sorption filter or, in the case of larger gas streams with higher concentration of adsorbable substances, through filters, until the sorption medium employed is loaded to a certain level with adsorbed substances, the sorbate. If several sorption filters are operated in parallel side-by-side, then the method is advantageously arranged so that this state of saturation does not occur simultaneously for the individual units. Thus in a group of 3 parallel sorption filters, 2 filters may be on stream and the third filter may be undergoing desorption. The saturated sorption filter is taken out of the gas stream by closing the shutters 311, 312, 321 and 322. The protective gas from generator 11 is fed-in via the lines 112 and 113, with the valves in these lines open, into the buffer spaces between the shutters 311 and 312 and the shutters 321 and 322. At the same time inert protective gas can be introduced via the line 111, with the valve in line 111 open, into the system consisting of the sorption filter and the desorption medium loop and oxygen depletion obtained there. This is an advantageous protective measure if the sorbate contains low-boiling and easily flammable components to prevent ignition. Thereupon the inert gas generator 41 is put in operation and the desorption medium blower 43 started up. The hot inert gas generated by the inert gas generator 41 is drawn-in by the desorption medium blower 43 and is mixed in the mixing chamber 42 first with cold and low-oxygen air or gas and later with desorption medium of inert gas and gaseous desorbate. This mixture is fed via the line 47 to the interior of the sorption medium layer 2. The mixture flows through the sorption medium layer 2, desorbs the latter and heats it up, then collects in the outer space of the sorption layer 2 and flows back through the line 45 to the desorption medium blower 43. Due to the always inflowing, freshly generated inert gas, the liberated desorbate, and because of the increasing temperature, the gas volume in the desorption medium loop increases and the pressure in it increases accordingly. A portion of this gas volume containing desorbate and inert gas is released via the line 48 to an after-treatment, which may be after-combustion or cooling and condensation. This desorption is carried on until the sorbent is free of sorbate and also sorption medium has recovered the desired adsorption properties. As a rule, this is reached when the entire sorption medium layer is heated to an appropriately high temperature and the temperature in the outer space of the ring layer filter increases suddenly.

After this activating desorption is completed, the inert gas generator 41 is shut off but the desorption medium loop continues to be operated. Heat is removed by means of the annular-gap cooler 5. For this purpose the coolant blower 8 is in operation and the coolant blowing through the ring gap 5 takes heat from the system through the jacket 1 of the sorption filter. After the desorption no freshly generated inert gas is fed any longer to the sorption medium loop and as the temperature of the desorption medium drops continuously during the cooling following the desorption, underpressure in the adsorption zone would be generated which might draw back oxygen-containing air via the line 47. This is prevented by a supply of protective gas via the line 111 through which oxygen-free protective gas is fed into the system in such a manner that no underpressure can occur. After cooling is completed, the protective gas generator is switched off, the valves in the lines 111, 112 and 113 are closed, the desorption medium blower 43 is stopped and the shutters in the lines 45 and 47 are closed. By opening the dual shutters 311, 312 as well as 321, 322, the sorption filter is again switched into the gas stream for purifying the gas to be purified.

The apparatus and procedure for the adsorption of vaporous or gaseous impurities in sorption filters, from the air or other gases in accordance with the invention has the advantage that the jacket of the sorption filter has a temperature below about 600° C, even if, with the use of activated carbon as the sorbent, the activating desorption is conducted at temperatures of up to about 800° C. This overcomes any difficulties with respect to static stresses and impairment of the container jacket which would normally occur at high temperatures required for the activating desorption. Carrying out the desorption with inertization of the buffer spaces between the dual shutters shutting off the supply and discharge of the gas to be purified, as well as the possible pre-inertization of the system consisting of the sorption filter and the desorption medium loop permits safe initiation of the desorption particularly in the case of low-boiling and easily flammable substances. Of importance, the operating contition of cooling after desorbing can be safely controlled by filling up the gas volume in the system by the introduction of protective gas which is decreased due to the temperature reduction as activated carbon are used.

The embodiments of the invention in which an exclusive property or privilege is claimed are defined as follows:

1. Apparatus for the adsorption in sorption filters of vaporous or gaseous impurities from a stream of air or gas and for the desorption of the impurities by an inert gas after the filter is charged to a predetermined level, which comprises a sorption filter, a container surrounding said sorption filter, an outer jacket around said container, an annular gap between said container and said outer jacket through which coolant flows, an inlet conduit extending through said outer jacket, said gap and said container for the introduction of said stream of air or gas containing impurities for passage to one side of said filter permitting said air or gas to pass therethrough and charge said filter to a predetermined level, an outlet conduit extending through said container, said gap and said outer jacket for the discharge of said air or gas passing through said filter and leaving the side of the filter opposite the side of introduction of said air or gas, gas inlet closing means on the inlet side for introduction of said air or gas containing impurities, gas outlet closing means on the discharge side of said air or gas for blocking the flow of said air or gas, a combustion chamber outside said outer jacket for generating an inert gas, an inert gas inlet conduit extending through said outer jacket, said gap and said container for introducing said inert gas through said filter in a direction of flow opposite that of said air and gas to desorb said filter, an inert gas outlet conduit extending through said container, said gap and said outer jacket for the discharge of desorbate and inert gas, a coolant inlet extending through said outer jacket into said gap for the introduction of coolant flowing through said gap, and wherein the annular-gap cooler has at least three discharge openings in said outer jacket distributed substantially uniformly at the upper end of the container.

2. Apparatus according to claim 1, wherein said discharge openings are closed by louvers.

3. Apparatus according to claim 2, wherein said louvers are set to open at a pressure in said annular gap above atmospheric pressure.

4. Apparatus according to claim 1, wherein said gas inlet closing means have a pair of spaced dampers with an interspace therebetween and said gas outlet closing means have another pair of spaced dampers with an interspace therebetween.

5. Apparatus according to claim 4, including a protective gas generator for generating a protective gas, and connecting means for passing said protective gas to the interspace of said gas inlet closing means and the interspace of said gas outlet closing means.

6. Apparatus according to claim 5, including connecting means for passing said protective gas to said sorption filter.

7. Apparatus according to claim 1, wherein the sorption filter is a ring layer filter with said container surrounding a sorption medium layer composed of concentric perforated metal sheets and an adsorption medium disposed in between the concentric perforated sheets in the form of cylindrical rings.

8. Method for the adsorption in sorption filters of vaporous or gaseous impurities from a stream of air or gas and for the desorption of the impurities by an inert gas after the filter is charged to a predetermined level, which comprises passing said air or gas containing impurities through a ring layer sorption filter surrounded by a container to purify said air or gas, continuing said passage of air or gas until the impurities in said filter reach a predetermined level, terminating said passage of said air or gas containing impurities, passing a coolant in indirect heat exchange with said sorption filter by flowing said coolant over the outer surface of said container in a gap between said container and an outer jacket surrounding said container, generating a cold protective gas, passing said protective gas through said filter, passing said cold protective gas in the interspace between a pair of spaced dampers for blocking the inlet flow of said air or gas to said filter, and to the interspace between another pair of spaced dampers for blocking the outlet flow of said purified air or gas from said filter, generating a hot inert gas, passing said hot inert gas through said filter to desorb said filter, and flowing said coolant through said gap to extract heat from said container during desorption and to maintain the container at a temperature below about 600° C.

9. A method according to claim 8, wherein during desorption, a portion of cold protective gas is admixed with the inert hot gas to reduce the temperature of the hot inert gas.

10. A method according to claim 8, wherein after completion of desorption and termination of hot inert gas, cold protective gas is introduced to said filter to cool said filter prior to reintroduction of said stream of air or gas containing impurities.

11. A method according to claim 10, wherein during said cooling of said filter, cold protective gas is introduced into said interspace of the inlet flow and said interspace of the outlet flow, and said protective gas in said interspaces is permitted to bleed into the absorption zone during said cooling to compensate for shrinkage of gas in said absorption zone as a result of said cooling.

* * * * *